(12) United States Patent
Tetsuka et al.

(10) Patent No.: US 10,083,777 B2
(45) Date of Patent: Sep. 25, 2018

(54) FLAT TRANSMISSION DEVICE AND METHOD FOR USING SAME

(71) Applicant: TSUBAKIMOTO CHAIN CO., Osaka-shi, Osaka (JP)

(72) Inventors: Takayuki Tetsuka, Osaka (JP); Masashi Kunii, Osaka (JP)

(73) Assignee: TSUBAKIMOTO CHAIN CO., Osaka-shi (JP)

(*) Notice: Subject to any disclaimer, the term of this patent is extended or adjusted under 35 U.S.C. 154(b) by 51 days.

(21) Appl. No.: 15/036,930

(22) PCT Filed: Nov. 27, 2014

(86) PCT No.: PCT/JP2014/081437
§ 371 (c)(1),
(2) Date: May 16, 2016

(87) PCT Pub. No.: WO2015/083621
PCT Pub. Date: Jun. 11, 2015

(65) Prior Publication Data
US 2016/0314871 A1    Oct. 27, 2016

(30) Foreign Application Priority Data

Dec. 4, 2013 (JP) ................................. 2013-251449

(51) Int. Cl.
*H01B 7/18* (2006.01)
*F16G 13/18* (2006.01)
(Continued)

(52) U.S. Cl.
CPC .............. *H01B 7/18* (2013.01); *F16G 13/18* (2013.01); *H01B 7/04* (2013.01); *H01B 7/0823* (2013.01); *H02G 11/006* (2013.01)

(58) Field of Classification Search
None
See application file for complete search history.

(56) References Cited

U.S. PATENT DOCUMENTS

2004/0112625 A1   6/2004   Sheikholeslami et al.
2011/0121141 A1*  5/2011   Tatsuta .................... F16G 13/16
                                                                 248/49

(Continued)

FOREIGN PATENT DOCUMENTS

JP    63-253813 A    10/1988
JP    4-304111 A     10/1992
(Continued)

OTHER PUBLICATIONS

International Preliminary Report on Patentability (Form PCT/IB/373) of International Application No. PCT/JP2014/081437, dated Jun. 7, 2016, with Form PCT/ISA/237. (6 pages).
(Continued)

Primary Examiner — Dimary Lopez Cruz
(74) Attorney, Agent, or Firm — Westerman, Hattori, Daniels & Adrian, LLP

(57) ABSTRACT

A flat cable assembly has a belt-like portion. In the belt-like portion, cables capable of transmitting power and/or signals and a pair of tubular portions positioned at the opposite ends in the width direction are arranged in parallel with one another. Each tubular portion has a longitudinal multi joint supporting member inserted therein in a state where link members are arranged in series, and adjacent link members are pivotally connected to one another. The multi-joint supporting members are configured to limit pivoting motion in a first direction that intersects the longitudinal direction in a range to a previously defined bend radius, and to restrict flexing in a second direction that is opposite from the first direction.

8 Claims, 9 Drawing Sheets

(51) Int. Cl.
*H01B 7/04* (2006.01)
*H01B 7/08* (2006.01)
*H02G 11/00* (2006.01)

(56) References Cited

U.S. PATENT DOCUMENTS

| | | | |
|---|---|---|---|
| 2011/0240805 A1* | 10/2011 | Komiya | F16G 13/20 |
| | | | 248/68.1 |
| 2012/0187271 A1 | 7/2012 | Komiya | |
| 2012/0205498 A1 | 8/2012 | Komiya | |
| 2012/0228437 A1 | 9/2012 | Tatsuta et al. | |
| 2014/0042280 A1 | 2/2014 | Takeuchi et al. | |

FOREIGN PATENT DOCUMENTS

| | | |
|---|---|---|
| JP | 6-76787 U | 10/1994 |
| JP | 2002-315168 A | 10/2002 |
| JP | 2003-018733 A | 1/2003 |
| JP | 2006-507788 A | 3/2006 |
| JP | 2007-118678 A | 5/2007 |
| JP | 2009-023030 A | 2/2009 |
| JP | 2012-149752 A | 8/2012 |
| JP | 2012-170186 A | 9/2012 |
| JP | 2012-170245 A | 9/2012 |
| JP | 2013-76452 A | 4/2013 |

OTHER PUBLICATIONS

International Search Report dated Jan. 20, 2015, issued in counterpart International Application No. PCT/JP2014/081437 (2 pages).
Office Action dated Jun. 7, 2017, issued in counterpart Korean Patent Application No. 10-2016-7017165,with English translation. (13 pages).
Office Action dated Feb. 27, 2010, issued in counterpart Chinese Patent Application No. 201480065743.5, with English translation. (17 pages).

* cited by examiner

FLAT TRANSMISSION DEVICE AND METHOD FOR USING SAME

BACKGROUND OF THE INVENTION

The present invention relates to a flat transmission device such as a flat cable assembly and a flat hose assembly and to a method for using the transmission device. Specifically, a flat transmission device includes transmitting members arranged in parallel, in which the transmitting members in each adjacent pair are coupled to each other so that the device has a belt-like structure. The transmitting members include flexible cables for transmitting electricity such as power and signals and/or flexible hoses or tubes for transmitting air pressure or hydraulic pressure.

As such a flat transmission device, a flat cable assembly has been known that includes cables (one example of transmitting members) arranged in parallel. The cables in each adjacent pair are coupled to each other so that the flat cable assembly has a belt-like structure. Flat cable assemblies are used to supply power or signals to movable bodies in facilities such as machine tools. A flat cable assembly has a first end, which is a fixed end fixed to the main body of a facility, and a second end, which is a movable end fixed to a movable body of a facility. The flat cable assembly extends from the fixed end and is reversed at a flexed portion and coupled to the movable body at the movable end. When the movable body moves, the flat cable assembly follows the movable body while moving the flexed portion and supplies power or signals to the movable body.

If a flat cable assembly is used for an extended period of time, aging deterioration of the flat cable assembly gradually reduces the bend radius of the flexed portion. Since the section of the flat cable assembly extends in the air between the flexed portion and the movable body, that section sags due to its own weight. The amount of such sagging gradually increases due to aging deterioration. As the bend radius of the flexed portion of the flat cable assembly decreases, the load on the cables is increased. This shortens the life of the cables. Also, when the sagging of the flat cable assembly becomes great, movement of the movable body causes the sagging section to sway. This can cause the sagging section to contact other parts in the facility or slide along the section between the flexed portion of the flat cable assembly and the fixed end. As a result, the life of the flat cable assembly is shortened.

In the devices of Patent Documents 1 to 6, at least a part of the outer peripheral portion of the flat cable assembly is supported by a supporting member (a belt, a plastic tube, a sleeve member, or a cable guide). This restrains the bend radius of the flexed portion of the flat cable assembly from being excessively small and restrains the section between the flexed portion and the movable body from sagging excessively.

PRIOR ART DOCUMENTS

Patent Documents

Patent Document 1: Japanese Laid-Open Utility Model Publication No. 06-76787
Patent Document 2: Japanese Laid-Open Patent Publication No. 04-304111
Patent Document 3: Japanese Laid-Open Patent Publication No. 63-253813
Patent Document 4: Japanese Laid-Open Patent Publication No. 2002-315168
Patent Document 5: Japanese Laid-Open Patent Publication No. 2003-18733
Patent Document 6: Japanese Laid-Open Patent Publication No. 2007-118678

SUMMARY OF THE INVENTION

However, in the structure in which a supporting member is provided at least at a part of the outer peripheral portion of the flat cable assembly, the flat cable assembly has an increased thickness corresponding to the thickness of the supporting member. The supporting member is thus likely to contact the facility. If the supporting member slides on the facility during movement of the flat cable assembly, at least one of the supporting member and the facility is worn, producing wear debris. This problem is not limited to flat cable assemblies, but applies to flat hose assemblies and flat tube assemblies, in which hoses or tubes for transmitting air pressure or hydraulic pressure are integrated. The problem also applies to flat transmission devices that include at least two types of elongated members from cables, hoses, and tubes that are integrated to have a belt-like structure.

Accordingly, it is an objective of the present invention to provide a flat transmission device and a method for using the device that maintain the bend radius of a flexed portion for an extended period of time while limiting the thickness of the belt-like portion and restrain the section between the flexed portion and the movable end from sagging excessively.

Means and operational advantages for solving the above-described problem will now be described.

To achieve the foregoing objective, a flat transmission device that includes a belt-like portion and an elongated multi-joint supporting member is provided. A plurality of flexible transmitting members capable of transmitting electricity or pressure and one or more flexible tubular members are arranged in parallel. The transmitting members in each adjacent pair, or the transmitting member and the tubular member in each adjacent pair, or the tubular members in each adjacent pair are coupled to each other to form a belt-like structure. The elongated multi-joint supporting member includes link members, wherein the link members are arranged in series, and the link members in each adjacent pair are pivotally coupled to each other. The multi-joint supporting member is restricted from being pivoted beyond a previously defined bend radius in a first direction along an axis that is perpendicular to a longitudinal axis and is restricted from flexing in a second direction that is opposite to the first direction. The multi-joint supporting member is inserted into at least one of the tubular members. The transmitting members may include only either a type that transmits electricity such as power and signals (such as cables) or a type that transmits fluid pressure such as air pressure and hydraulic pressure (such as hoses and tubes). The transmitting members may also include two or more types for different transmission media.

With this configuration, a first end (a fixed end) of the belt-like portion may be fixed, and the flexed portion is provided between the fixed end of the belt-like portion and the movable end. A second end (a movable end) may be coupled to the movable body. In this case, the multi-joint supporting member inserted into the tubular member restrains the bend radius of the flexed portion from being less than the previously defined bend radius. Further, the section that extends in the air between the flexed portion and the movable end is restrained from sagging due to its own weight. Accordingly, the bend radius of the flexed portion is maintained for an extended period of time while limiting the thickness of a belt-like portion, and the section that extends in the air between the flexed portion and the movable end is prevented from sagging. The multi-joint supporting member is inserted into the tubular member. Thus, if the tubular member is configured to have no openings such as holes or slits, the wear debris that is produced by sliding between the multi-joint supporting member and the tubular member is restrained from being scattered to the outside.

In the above described flat transmission device, the tubular members preferably include two tubular members that are provided on opposite sides in a width direction of the belt-like portion, and the multi-joint supporting member is preferably inserted into each of the tubular members. The opposite sides of the belt-like portion in the width direction are not limited to the opposite ends of the belt-like portion, but include positions of the second elongated members from the opposite ends. Alternatively, the two tubular members on the opposite sides are not necessarily arranged at symmetrical positions on the opposite sides in the width direction of the belt-like portion. With this structure, the multi-joint supporting members inserted into the two tubular members on the opposite sides firmly support the belt-like portion with respect to the width direction.

In the above described flat transmission device, the tubular members preferably include one tubular member that is provided at a center in the width direction of the belt-like portion, and the multi-joint supporting member is preferably inserted into the tubular member at the center.

With this configuration, the belt-like portion is supported at the center in the width direction. Thus, the belt-like portion is supported in a balanced manner with respect to the width direction. For example, even in a case in which only one multi-joint supporting member is provided, the belt-like portion is supported in a balanced manner with respect to the width direction.

In the above described flat transmission device, the opposite sides in the width direction of the belt-like portion are opposite ends in the width direction of the belt-like portion.

With this configuration, since the multi-joint supporting members support the belt-like portion at the opposite ends in the width direction, the belt-like portion is thus firmly supported with respect to the width direction.

In the above described flat transmission device, the transmitting members preferably include two transmitting members each located at one of opposite ends in a width direction of the belt-like portion and one transmitting member located at a center in the width direction of the belt-like portion, and the tubular members preferably include at least two tubular members that are each arranged between one of the two transmitting members at the opposite ends and the transmitting member located at the center. The multi-joint supporting member is preferably inserted into each of the tubular members.

With this configuration, at least one tubular member is provided between each end and the center in the width direction of the belt-like portion. Thus, at least two tubular members are provided, each of which receives a multi-joint supporting member. Since the belt-like portion is supported by at least two multi-joint members, the belt-like portion is supported in a balanced manner with respect to the width direction. This also limits warping of the belt-like portion in the width direction.

A method for using a flat transmission device is provided. In a belt-like portion, a plurality of flexible transmitting members capable of transmitting electricity or pressure and one or more tubular members are arranged in parallel. The transmitting members in each adjacent pair, or the transmitting member and the tubular member in each adjacent pair, or the tubular members in each adjacent pair are coupled to each other to form a belt-like structure. An elongated multi-joint supporting member includes link members, wherein the link members are arranged in series, and the link members in each adjacent pair are pivotally coupled to each other. The multi-joint supporting member is restricted from being pivoted beyond a previously defined bend radius in a first direction along an axis that is perpendicular to a longitudinal axis and is restricted from flexing in a second direction that is opposite to the first direction. The method includes: inserting the multi-joint supporting member into at least one of the tubular members; in a state in which a fixed end, which is a first end in a longitudinal direction of the belt like portion of the flat transmission device, is fixed, when moving a movable end, which is a second end of the belt-like portion, while forming a flexed portion in a middle of the belt-like portion, restricting flexing of the flexed portion, which moves together with the movable end, within a range to a bend radius, which is previously defined by the multi-joint supporting member; and restricting flexing of the multi-joint supporting member in the second direction, thereby restraining a section between the flexed portion and the movable end from warping due to an own weight. This method achieves the same advantages as those of the above-described flat transmission device.

Effects of the Invention

The present invention maintains the bend radius of the flexed portion for an extended period of time while limiting the thickness of the belt-like portion and restraining the section between the flexed portion and the movable end from sagging excessively.

DETAILED DESCRIPTION OF THE PREFERRED EMBODIMENTS

First Embodiment

A flat transmission device according to a first embodiment, which is a flat cable assembly, will be described with reference to the drawings.

Figure 1:
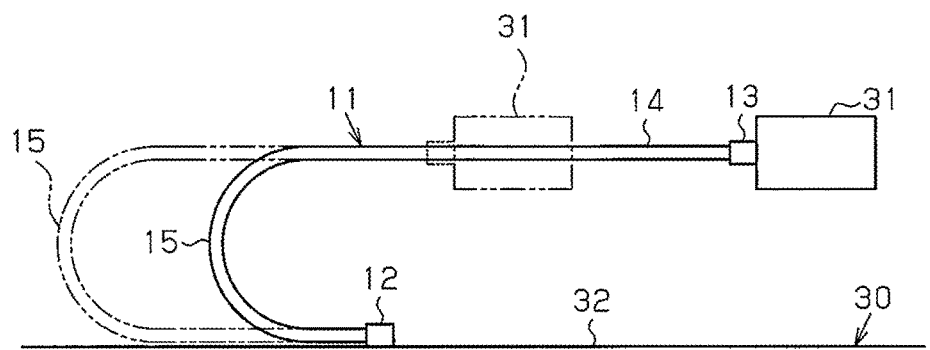
FIG. 1 is a diagrammatic side view showing a facility equipped with a flat cable assembly according to a first embodiment.

As shown in FIG. 1, a flat cable assembly 11 is used to supply power from a power source (not shown) in a facility 30 such as a machine tool to a movable body 31, which is movably provided in the facility 30. A first clamp member 12, which holds a fixed end of the flat cable assembly 11, is fixed at a predetermined position on an attachment surface 32, which is substantially parallel with the movement path of the movable body 31 in the facility 30. A second clamp member 13, which holds a movable end of the flat cable assembly 11, is fixed to the movable body 31.

As shown in FIG. 1, the flat cable assembly 11 includes a belt-like portion 14, the opposite ends of which are held by the first and second clamp members 12, 13. The belt-like portion 14 has a flat structure with flexible cables arranged in a row. The belt-like portion 14 has a fixed end held by the first clamp member 12 and a movable end held by the second clamp member 13. The flat cable assembly 11 extends from the fixed end in a direction opposite to the direction toward the movable end with respect to the moving direction of the movable body 31. The flat cable assembly 11 also has a semicircular flexed portion 15 located between the fixed end and the movable end. The flexed portion 15 reverses the extending direction of the flat cable assembly 11. The flat cable assembly 11 is arranged to extend substantially straight in the air from the flexed portion 15 to the movable end.

Figure 2:
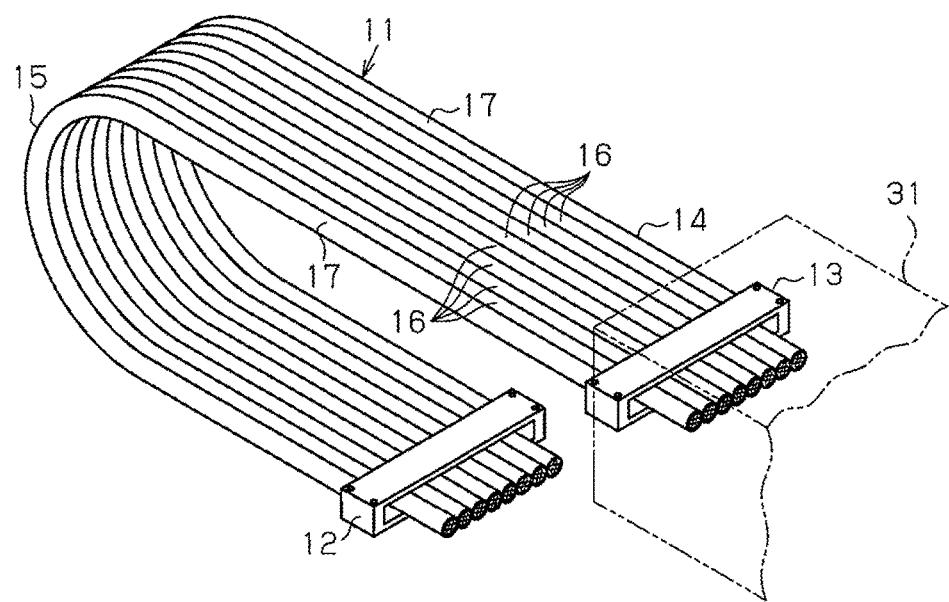
FIG. 2 is a diagrammatic perspective view showing the flat cable assembly of FIG. 1.

As shown in FIG. 2, the flat cable assembly 11 of the present embodiment includes cables 16, which function as transmitting members, and a pair of supporting portions 17. The supporting portions 17 are arranged at the opposite ends in the width direction, which is perpendicular to the extending direction of the cables 16. The cables 16 are capable of transmitting power and/or signals.

The supporting portions 17 are provided for adding stiffness to the belt-like portion 14, while maintaining the shape of the belt-like portion 14. Each supporting portion 17 includes a tubular portion 18, which is a tubular member, and a multi-joint supporting member 20 (see FIG. 3) inserted into the tubular portion 18. The tubular portion 18 is made of the same material as coating members 16a of the cables 16 (a plastic in the present embodiment). The two tubular portions 18 are each integrally coupled to the coating member 16a of the adjacent cable 16. Each tubular portion 18 has a tubular shape without any openings such as holes or cutouts, except for the open ends at the opposite ends in the longitudinal direction.

Figure 3:
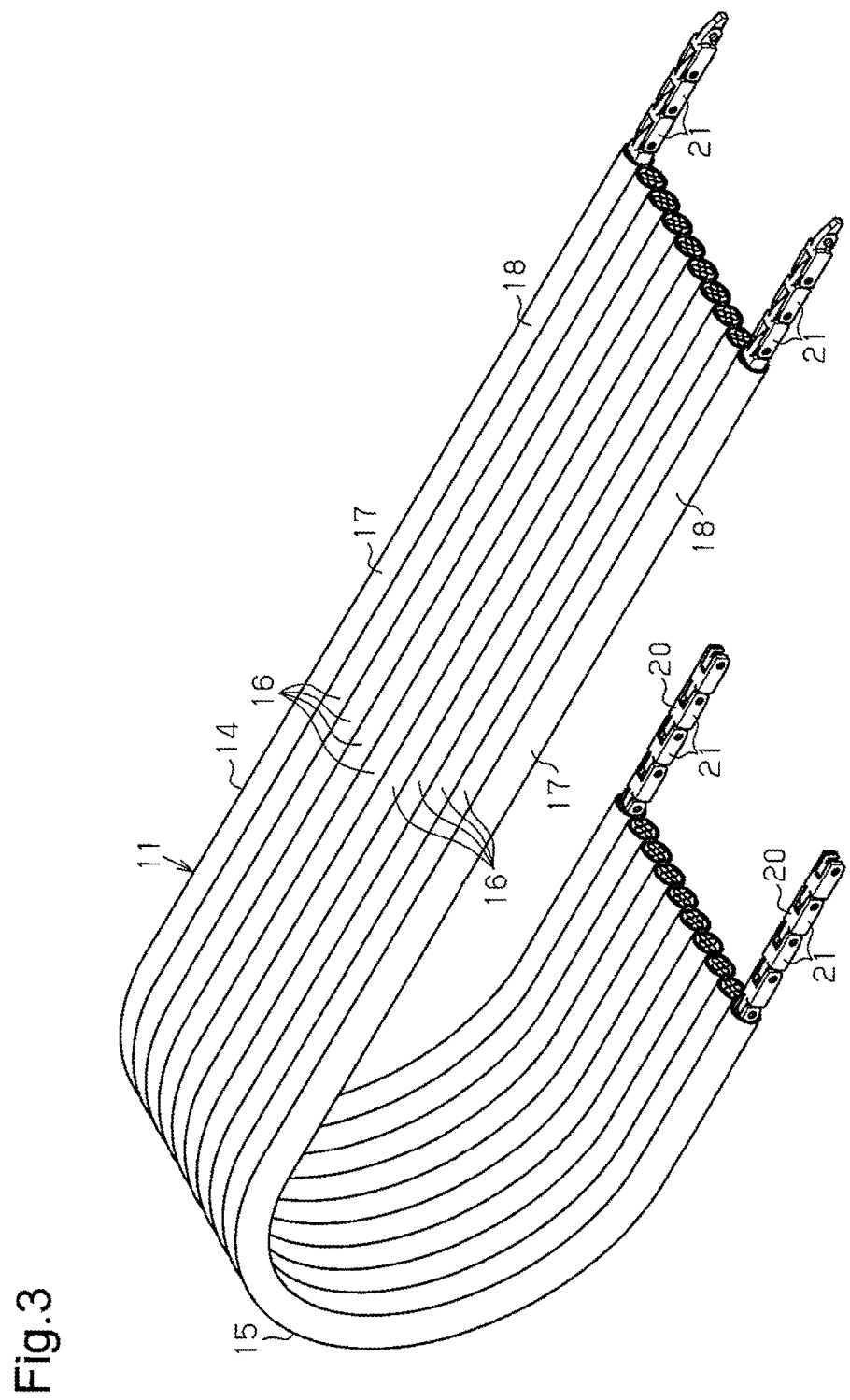
FIG. 3 is a perspective view, with a part cut away, illustrating the flat cable assembly of FIG. 1.
Figure 5A:
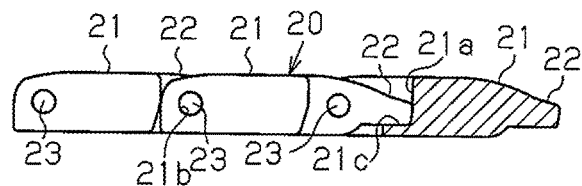
FIG. 5A is a partial side view showing a multi-joint supporting member in a straight position.
Figure 5B:
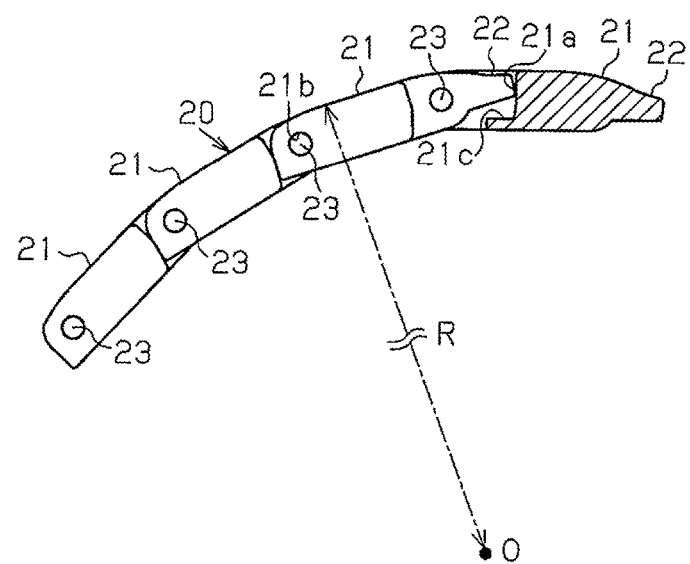
FIG. 5B is a partial side view showing the multi-joint supporting member in the most flexed state.

As shown in FIG. 3, each multi-joint supporting member 20 is constituted by coupling link members 21 and is flexible in a first direction along an axis that intersects the longitudinal axis, from a straight position. The multi-joint supporting members 20 can flex inward until the bend radius reaches a previously defined bend radius R as shown in FIGS. 5A and 5B, but cannot flex beyond the straight position in the outward direction, which is opposite to the inward direction. The first end and the second end of the flat cable assembly 11 are fixed to the fixed end and the movable end, respectively. When the flat cable assembly 11 is attached to the movable body 31 on the facility 30, the bend radius of the flexed portion 15, which is provided between the fixed end and the movable end, cannot be made smaller than the previously defined bend radius R. Therefore, the previously defined bend radius R is the minimum value. A section of the flat cable assembly 11 that extends in the air between the flexed portion 15 and the movable end receives a sagging force due to its own weight. Each multi-joint supporting member 20 is configured not to flex beyond the straight position in a second direction, which is a direction opposite to the first direction, in which the multi-joint supporting member 20 can flex. Thus, the section of the flat cable assembly 11 that extends in the air is restrained from flexing in the sagging direction.

As shown in FIG. 3, the two multi-joint supporting members 20 in the tubular portions 18 are arranged such that the flexing directions agree and that the non-flexing directions agree. That is, the two multi-joint supporting members 20, which are inserted into the tubular portions 18, are arranged to flex in the same direction.

Each of the multi-joint supporting members 20 shown in FIG. 3 has a predetermined length and includes link members 21 arranged in series. The link members 21 in each adjacent pair are pivotally coupled to each other. In the present embodiment, the length of the multi-joint supporting members 20 is shorter than that of the cables 16.

The length of the multi-joint supporting members 20 is substantially equal to the distance between the two clamp members 12, 13 of the flat cable assembly 11. The tubular portions 18 are tightly held by the two clamp members 12, 13. The flat cable assembly 11 has a connection end that projects outward from the first clamp member 12 and is connected to a power supplying terminal in the facility 30. The flat cable assembly 11 also has a connection end that projects outward from the second clamp member 13 and is connected to a power receiving terminal in the movable body 31. Accordingly, power is supplied from a power supplying device in the facility 30 to various electrical devices (not shown) in the movable body 31 through the flat cable assembly 11.

Figure 4:
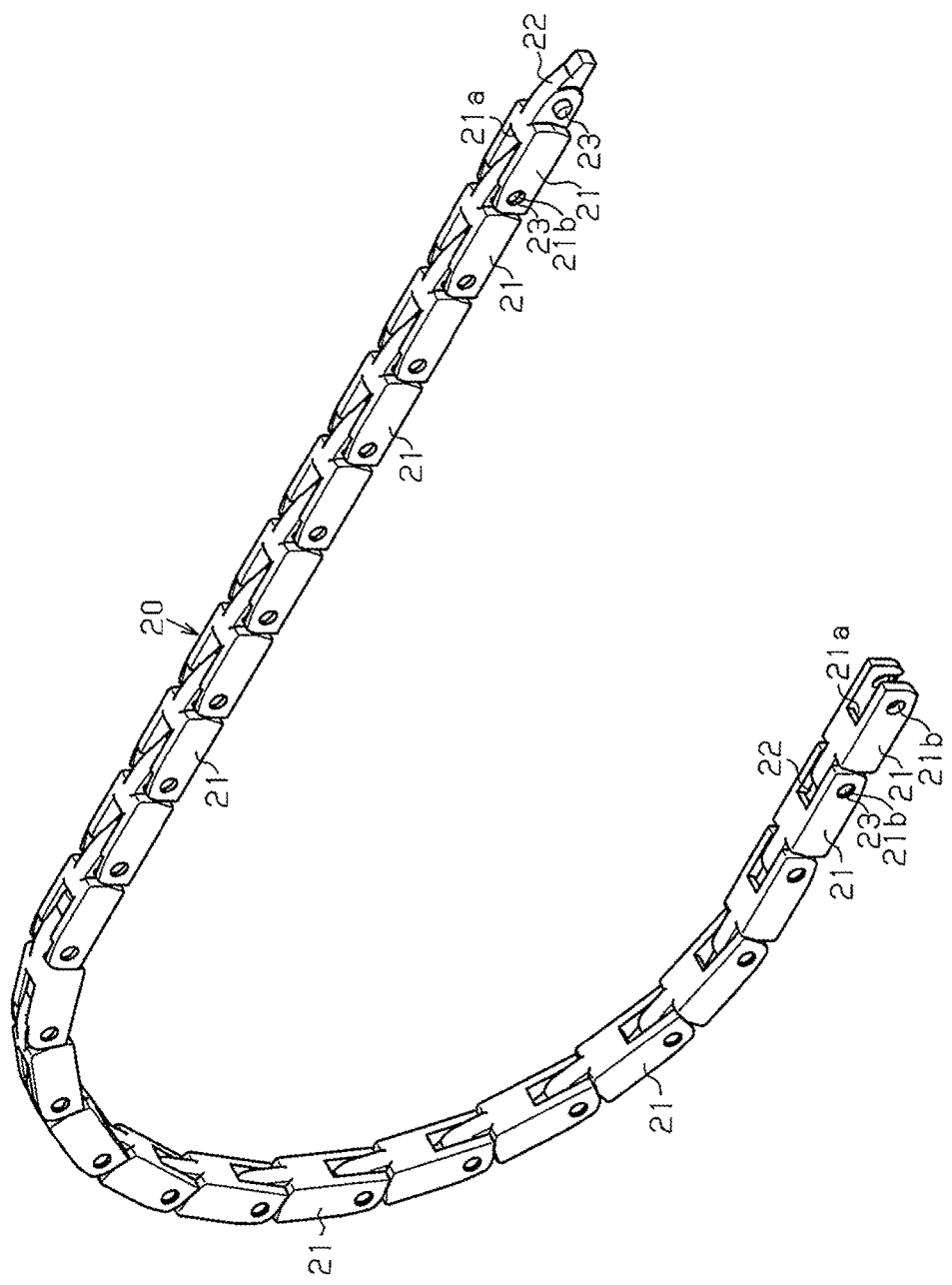
FIG. 4 is a perspective view showing a multi-joint supporting member.

As shown in FIG. 4, each multi-joint supporting member 20 is formed to have an elongated shape by pivotally coupling link members 21 in series. The link members 21 are coupled to each other to be allowed to pivot in a first direction (the inward direction in relation to the curved shape in FIG. 4) along an axis that is perpendicular to both of the longitudinal axis of the multi-joint supporting member 20 and the axes of the coupling shafts (pivots) of the link members 21. This pivoting motion is restricted within the range to the previously defined bend radius R (see FIG. 5B). Further, the link members 21 are coupled to each other such that the link members 21 are restricted from flexing in the straight position in a second direction (the direction outward in relation to the curved shape in FIG. 4), which is a direction opposite to the first direction.

Each link member 21 includes a base and a thin-plate like extension 22, which extends from a first end of the base and has a smaller thickness than the base. The extension 22 has a pair of shaft portions 23 protruding from the opposite sides. Each link member 21 has a recess 21a at a second end, which receives the extension 22 of the adjacent link member 21. Each link member 21 has a pair of holes 21b in the base. The shaft portions 23 of the adjacent link member 21 are inserted into the holes 21b, so that the link members 21 in each adjacent pair are coupled to each other to pivot about the shaft portions 23.

As shown in FIG. 5A, each multi-joint supporting member 20 is restricted from flexing in the second direction (upward direction as viewed in FIG. 5A) from the straight position by the extension 22 of each link member 21 contacting a restricting surface 21c in the corresponding recess 21a. Also, as shown in FIG. 5B, each multi-joint supporting member 20 is restricted from flexing beyond the previously defined bend radius R in the first direction (the downward direction as viewed in FIG. 5B) by the extension 22 of each link member 21 contacting the inner wall of the recess 21a of the adjacent link member 21. That is, each multi-joint supporting member 20 is restricted from flexing beyond the previously defined bend radius R in the first direction, so that the bend radius of the multi-joint supporting member 20 cannot be reduced below the bend radius R.

Figure 6:
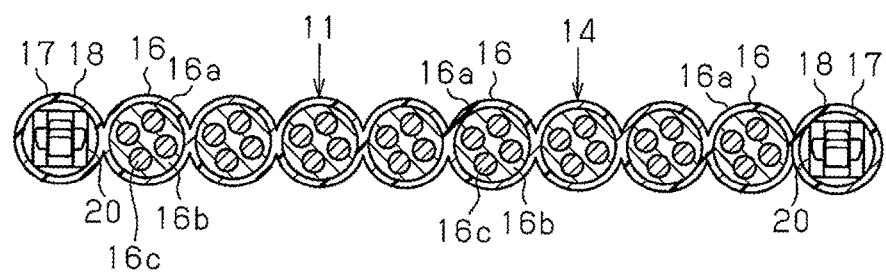
FIG. 6 is a diagrammatic cross-sectional view along the width, showing the flat cable assembly of FIG. 1.

As shown in FIG. 6, the belt-like portion 14 of the flat cable assembly 11 includes eight cables 16 and two supporting portions 17. The eight cables 16 are arranged at positions except for the opposite ends in the width direction (the lateral direction as viewed in FIG. 6). The supporting portions 17 are located at the opposite ends of the belt-like portion 14 in the width direction and each include a tubular portion 18 and a multi-joint supporting member 20 inserted into the tubular portion 18. Each cable 16 includes a conducting wire 16b, which has one or more power lines or signal lines 16c in it, and a coating member 16a (sheath) coating the conducting wire 16b. The coating member 16a of the cable 16 is made of a plastic. In the present embodiment, as one example, the coating member 16a and the tubular portion 18 are made of the same plastic. Thus, the coating member 16a of the cable 16 and the tubular portion 18 are firmly joined to each other.

The outside diameter of the tubular portions 18 is substantially equal to the outside diameter of the cables 16. Also, the thickness of the tubular portions 18 is substantially equal to the thickness of the cables 16. That is, the inside diameter of the tubular portion 18 is substantially equal to the inside diameter of the cable 16. The multi-joint supporting members 20 have a size that can be inserted into the tubular portions 18. Therefore, in the present embodiment, the diameter of the largest circumcircle that contacts a cross section of each multi-joint supporting member 20 that is perpendicular to the longitudinal axis is smaller than the largest outside diameter of the cables 16. For example, the multi-joint supporting members 20 are inserted into the holes in the tubular portions 18 in a slightly press-fitting manner. It is needless to mention that the multi-joint supporting members 20 may have a size that contacts the inner circumferential surface of the tubular portions 18 or a size that creates a slight clearance from the inner circumferential surface of the tubular portions 18. Further, although the outside diameter of the tubular portions 18 is set to be substantially equal to the outside diameter of the cables 16 in the present embodiment, the outside diameter of the tubular portions 18 may be larger than or smaller than the outside diameter of the cables 16. However, the outside diameter of tubular portions 18 is preferably smaller than or equal to the largest outside diameter of the cables 16.

Figure 7A:
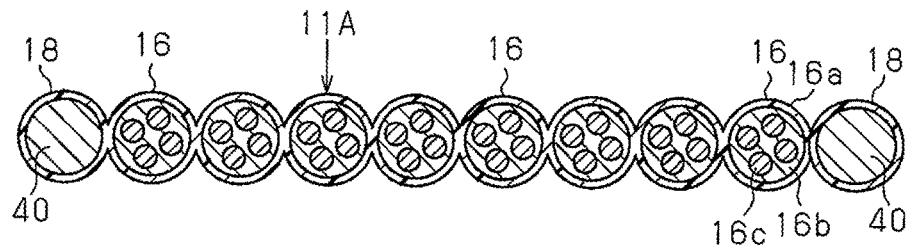
FIG. 7A is a diagrammatic cross-sectional view showing the state after extrusion of the intermediate product of the flat cable assembly shown in FIG. 1.

A method for manufacturing the flat cable assembly 11, which is configured in the above-described manner, will now be described with reference to FIGS. 7A, 7B and 8. In this manufacturing method, an extruder capable of forming the belt-like portion 14 of the flat cable assembly 11 is used. In the extruder, a required number of the conducting wires 16b of the cables 16 and core members 40 for forming the tubular portions 18 are set and continuously supplied to the feed port. The two core members 40 are arranged on the opposite sides in the width direction of the eight conducting wires 16b and supplied to the extruder.

The manufacturing method of the flowchart in FIG. 8 will now be described with reference to FIGS. 7A and 7B. As shown in FIG. 8, at step S10, the conducting wires 16b and the core members 40 are set at the feed port of the extruder and the flat cable assembly 11 (the belt-like portion 14) is extruded. Each conducting wire 16b has one or more power lines or signal lines 16c in it. The core members 40 are used to form a hollow inner structure in each tubular portion 18. To form cylindrical tubular portions, the core members 40 have, for example, a columnar shape. Through the extrusion, the conducting wires 16b and the core members 40 are coated with plastic tubes having a substantially uniform thickness. Further, the plastic of the tubular structures in each adjacent pair are coupled to form an integrally formed flat intermediate production, which is a flat cable assembly 11A.

That is, through the extrusion performed by the extruder, the tubular coating members 16a, which coat the conducting wires 16b, and the tubular portions 18, which cover the core members 40, are formed integrally. At this time, the coating members 16a in each adjacent pair are coupled to each other, and the coating member 16a and the tubular portion 18 in each adjacent pair are coupled to each other. In this manner, the two tubular portions 18 are formed simultaneously with the coating members 16a by using the extruder, which is used to form the belt-like portion of the flat cable assembly 11.

Figure 7B:
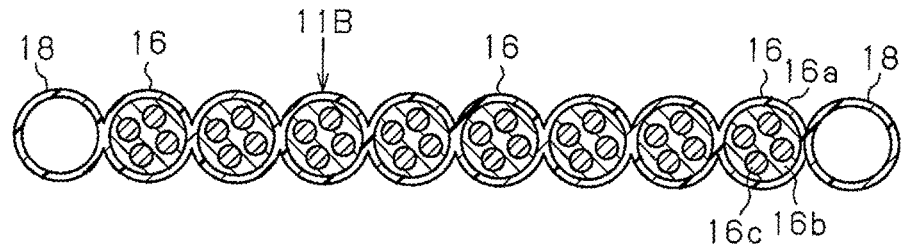
FIG. 7B is a diagrammatic cross-sectional view showing the state after the cores are removed from the flat cable assembly of FIG. 7A.
Figure 8:
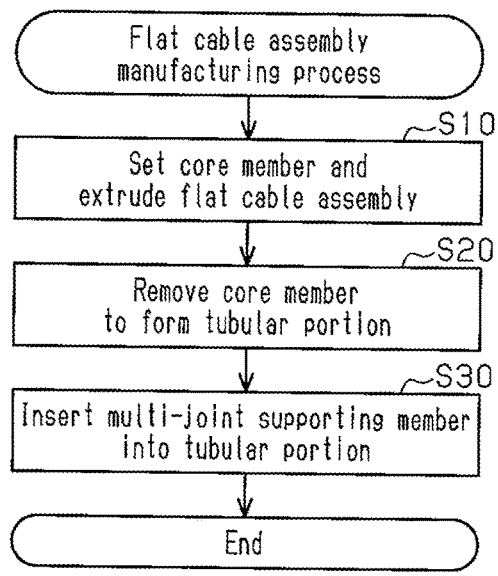
FIG. 8 is a flowchart showing a process for manufacturing the flat cable assembly.

In the subsequent step S20, the core members 40 are removed to form the tubular portions 18 (refer to FIG. 7B). Then, the flat cable assembly 11B, which is an intermediate product having the two tubular portions 18, is cut to a necessary length. The cutting may be executed before the core members 40 are removed. For example, if the material of the core member 40 is hard and difficult to cut, the flat cable assembly 11B may be cut after the core members 40 are removed. If the material of the core members 40 is softer than that of the cables 16, the flat cable assembly 11A may be cut before the core members 40 are removed. However, the material of the core members 40 is preferably easier to cut than that of the conducting wires 16b.

At step S30, the multi-joint supporting members 20 are inserted into the tubular portions 18. At this time, the two multi-joint supporting members 20 are inserted into the tubular portions 18 in a state in which the flexible first directions of the multi-joint supporting members 20 agree with each other in relation to the belt-like portion 14. The flat cable assembly 11 shown in FIGS. 3 and 6 is thus completed.

In the above illustrated example of a manufacturing method, the core members 40 are used. However, dies that replace the core members 40 may be used, so that tubular portions are continuously extruded by the extruder. This manufacturing method eliminates the necessity for removal of the core members 40. Thus, compared to the above-described manufacturing method, the manufacturing efficiency is improved.

Operation of the flat cable assembly 11 will now be described.

As shown in FIGS. 2 and 5, the flat cable assembly 11 has, at the opposite ends in the width direction, the tubular portions 18. The multi-joint supporting members 20 are inserted into the tubular portions 18, with the flexible first directions matched with each other. When installing the flat cable assembly 11 to the facility 30 shown in FIG. 1, the clamp member 12 (the fixed end) is fixed to the attachment surface 32 such that the flexible first direction of the multi-joint supporting members 20 is oriented inward of the flexed portion 15, and the clamp member 13 (the movable end) is fixed to the movable body 31.

As shown in FIG. 1, during the process of movement of the movable body 31, the belt-like portion 14 is supported by the supporting portions 17 at the opposite ends in the width direction, and the bend radius of the flexed portion 15 is maintained to be greater than or equal to the previously defined bend radius R. The section that extends in the air between the flexed portion 15 and the movable end receives a force in the sagging direction due to its own weight. Since the sagging direction agrees with the direction in which the multi-joint supporting members 20 of the supporting portions 17 are restricted from flexing beyond the straight position, the flat cable assembly 11 is restrained from sagging.

If the bend radius of the flexed portion 15 of the flat cable assembly 11 were set to be excessively small, the cables 16 would flex excessively at the flexed portion, which would shorten the life of the cables 16. However, since the bend radius of the flexed portion 15 of the flat cable assembly 11 according to the present embodiment is maintained to be greater than or equal to the previously defined bend radius R, the cables 16 will not flex excessively at the flexed portion 15. As a result, the cables 16 will not flex excessively.

Also, if the section of the flat cable assembly that extends in the air between the flexed portion and the movable end sags largely, the sagging section tends to sway vertically when the movable body 31 moves. When the flat cable assembly sways, the swaying part can contact the facility. In this case, the part of the flat cable assembly that contacts the facility may be worn, and the part of the facility that contacts the flat cable assembly may be worn. Also, the swaying motion of the flat cable assembly applies a great load to the cables. In contrast, in the flat cable assembly 11 of the present embodiment, the section that extends in the air between the flexed portion 15 and the movable end is restricted from flexing from the straight position by the multi-joint supporting members 20 in the supporting portions 17. The section is therefore restrained from sagging. Thus, the flat cable assembly 11 is not easily swayed, and the cables 16 do not easily receive the load caused by swaying motion of the flat cable assembly 11. Since the flat cable assembly 11 is not easily swayed, the flat cable assembly 11 does not easily contact the facility, and the part of the flat cable assembly 11 that would contact the facility due to such swaying motion is restrained from being worn. Likewise, the part of the facility that would contact the flat cable assembly 11 is restrained from being worn.

The multi-joint supporting members 20 are inserted into the tubular portions 18. Thus, even if the multi-joint supporting members 20 wear in the tubular portions 18, the wear debris is unlikely to be scattered to the outside.

The present embodiment described above has the following advantages.

(1) The tubular portions 18 are arranged on the opposite sides in the width direction of the belt-like portion 14 of the flat cable assembly 11. An elongated multi-joint supporting member 20 is inserted into each tubular portion 18. The multi-joint supporting members 20 are restricted from being pivoted beyond the bend radius R in the first direction along the axis that is perpendicular to the longitudinal axis. The multi-joint supporting members 20 are also restricted from flexing in the second direction, which is opposite to the first direction. Accordingly, the necessary bend radius of the flexed portion 15 is maintained for an extended period of time, and the thickness of the belt-like portion 14 is limited. Also, the section between the flexed portion 15 and the movable end is restrained from sagging excessively. This extends the life of the flat cable assembly 11.

(2) The supporting members that are disclosed in Patent Documents 1 to 6 do not need to be provided on the outer circumference of the belt-like portion 14. Thus, the advantage of the flat cable assembly 11 is maintained that the thickness of the belt-like portion 14 can be made substantially equal to the outside diameter of the cables 16. Particularly, the multi-joint supporting members 20 are formed to have a size that can be inserted into the tubular portions 18, which have an outside diameter that is less than or equal to the outside diameter of the coating members 16a (sheath) of the cables 16 (the same outside diameters in the present embodiment). Thus, the thickness of the belt-like portion 14 can be set less than or substantially equal to (substantially equal thickness in the present embodiment) the conventional flat cable assemblies, which do not have the tubular portions 18. Also, the width of the belt-like portion 14 is widened by the widths of the tubular portions 18. However, since the outside diameter of each tubular portion 18 is less than or equal to that of each cable 16, the widened width is negligible. When the flat cable assembly 11 is moving, the position of the flat cable assembly 11 changes relatively greatly in the thickness direction so that the flat cable assembly 11 is likely to slide on other parts. However, since the position of the flat cable assembly 11 changes by a relatively small amount in the width direction, slight increase in the width is negligible. Thus, the space-saving feature and the weight reduction feature of the flat cable assembly 11 are substantially maintained. The shapes that are allowed for the multi-joint supporting members 20 add stiffness to the flat cable assembly 11 so that a path of the flat cable assembly 11 is secured.

(3) The multi-joint supporting members 20 are inserted into the tubular portions 18, which have tubular shapes without any opening such as holes or cutouts, except for the open ends. Thus, wear debris that is produced by sliding between the multi-joint supporting members 20 and the tubular portions 18 is restrained from being scattered to the outside. Also, when the shapes of the multi-joint supporting members 20 are changed as the movable body 31 is moved, the accompanying noise is prevented from escaping to the outside by the tubular portions 18. This reduces noise such as drive noise.

(4) Since the two tubular portions 18 are arranged on the opposite sides in the width direction of the belt-like portion 14, the multi-joint supporting members 20 inserted into the tubular portions 18 support the belt-like portion 14 in the width direction. Thus, the entire width of the belt-like portion 14 is firmly supported.

(5) Particularly, since the two tubular portions 18 are arranged at the opposite ends on the opposite sides in the width direction of the belt-like portion 14, the multi-joint supporting members 20, which are inserted into the tubular portions 18, support the belt-like portion 14 at the opposite ends in the width direction. Thus, the entire width of the belt-like portion 14 is further firmly supported.

(6) The flat cable assembly 11 is formed by simply forming the tubular portions 18 together with the belt-like portion 14, which has the conducting wires 16b coated with the coating members 16a, and inserting the multi-joint supporting members 20 into the tubular portions 18. Therefore, it is easy to manufacture the flat cable assembly 11, which is capable of maintaining the flexed posture and the straight posture in a reliable manner.

(7) Since the belt-like portion 14 is restrained from sagging, the belt-like portion 14 is restrained from swaying when the movable body 31 moves rapidly. The flat cable assembly 11 thus allows the movable body 31 to move rapidly.

(8) The tubular portions 18 constitute the belt-like portion 14 together with the cables 16. An elongated multi-joint supporting member 20 is inserted into each tubular portion 18. The multi-joint supporting members 20 are restricted from being pivoted beyond the previously defined bend radius R in the first direction. The multi-joint supporting members 20 are also restricted from flexing in the second direction, which is opposite to the first direction, from the straight position. The above-described method for using the flat cable assembly 11 is as follows. That is, as the movable body 31 moves, the flexed portion 15 of the flat cable assembly 11 moves. At this time, the multi-joint supporting members 20 restrict the flexing of the flexed portion 15 within the range to the previously defined bend radius R. Also, since the multi-joint supporting members 20 are restricted from flexing in the second direction, the section between the movable end of the flat cable assembly 11 and the flexed portion 15 is restrained from sagging excessively due to its own weight. The method achieves the same advantages as advantages (1) to (7) described above.

Second Embodiment

Figure 9:
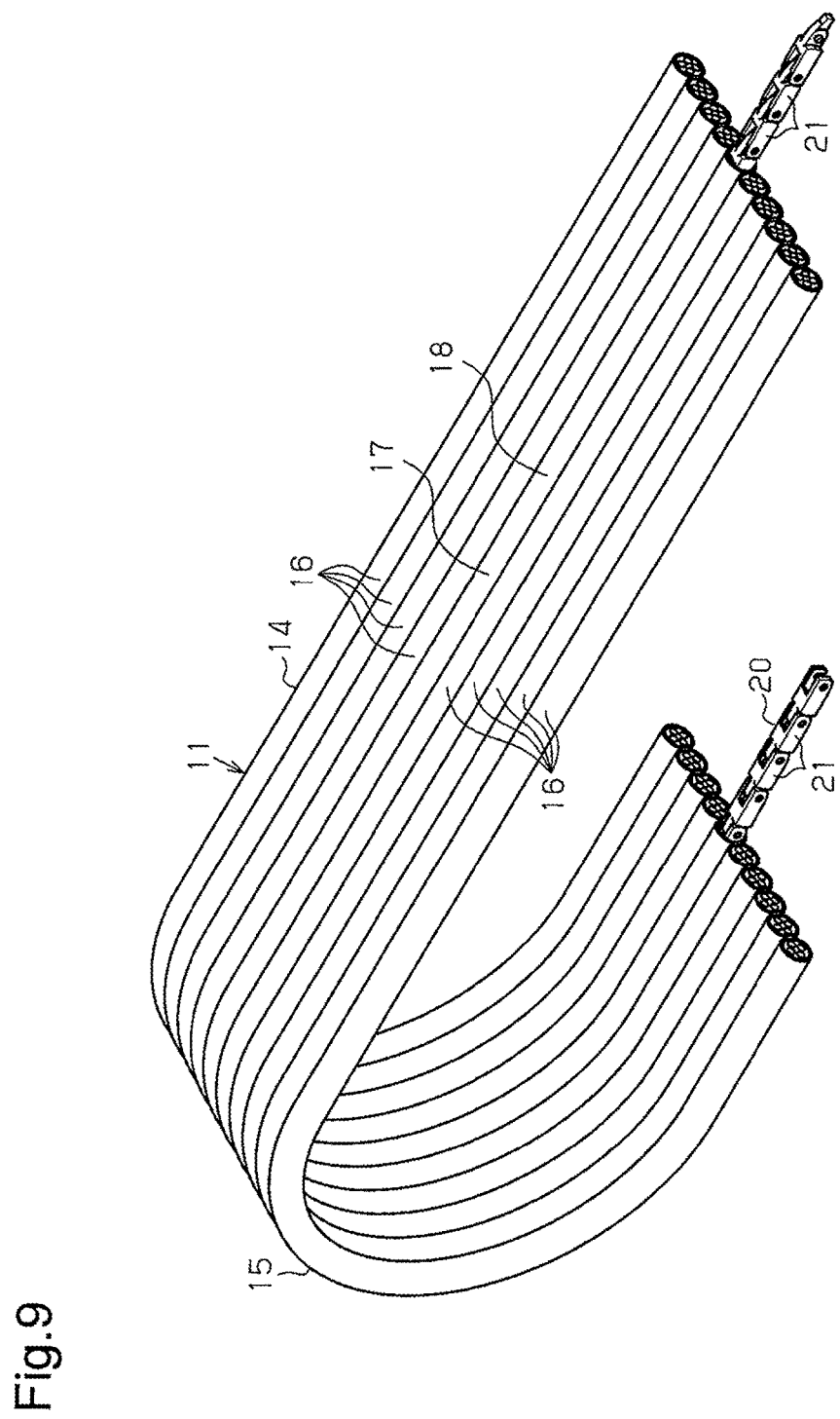
FIG. 9 is a perspective view, with a part cut away, illustrating a flat cable assembly according to a second embodiment.
Figure 10:
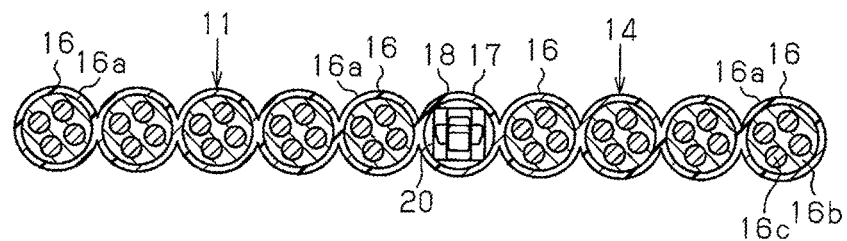
FIG. 10 is a diagrammatic cross-sectional view along the width, showing the flat cable assembly of FIG. 9.

Next, a flat transmission device according to a second embodiment, which is a flat cable assembly 11, will now be described with reference to FIGS. 9 to 11. As shown in FIGS. 9 and 10, the flat cable assembly 11 includes a single tubular portion 18 at the center in the width direction of a belt-like portion 14, which constitutes the flat cable assembly 11. A multi-joint supporting member 20 is inserted into the single tubular portion 18. The tubular portion 18 is provided at the center in the width direction of the belt-like portion 14, and the multi-joint supporting member 20 is inserted into the hole of the tubular portion 18. In this structure, if the belt-like portion 14 is constituted by an even number of elongated members, the center in the width direction of the belt-like portion 14 may be either one of the two elongated members at the center in the width direction of the belt-like portion 14. If the belt-like portion 14 includes an odd number of elongated members, the position at the center in the width direction is preferable.

Figure 11:
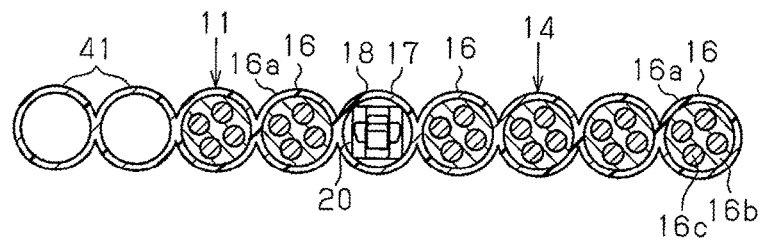
FIG. 11 is a diagrammatic cross-sectional view along the width, showing of a flat cable assembly according to a modification different from that of FIG. 9.

For example, as shown in FIG. 11, if the belt-like portion 14 includes an odd number of elongated members, the position of the tubular portion 18, in which the multi-joint supporting member 20 is inserted, is preferably at the center in the width direction of the belt-like portion 14. However, that position may be one of the positions adjacent to the center in the width direction of the belt-like portion 14. Also, as shown in FIG. 11, the transmitting members are not limited to the cables 16, but may be flexible tube portions 41, which are hoses or tubes capable of transmitting air pressure or hydraulic pressure. Further, one or more tube portions 41 may be provided to constitute a part of the belt-like portion 14.

The flat cable assembly 11 according to the second embodiment has the following advantage.

(9) The single tubular portion 18 is provided at the center in the width direction of the belt-like portion 14, and the multi-joint supporting member 20 is inserted into the single tubular portion 18. Thus, although the belt-like portion 14 is supported by the single supporting portion 17, the belt-like portion 14 is supported in a balanced manner. In the configuration in which a single tubular portion receiving a multi-joint supporting member is provided at an end of a belt-like portion, cables that are away from that end are not supported and thus sag due to the own weight. In contrast, according to the second embodiment, the belt-like portion 14 is supported at the center in the width direction by the single supporting portion 17, so that the belt-like portion 14 is restrained from sagging.

Third Embodiment

Figure 12:
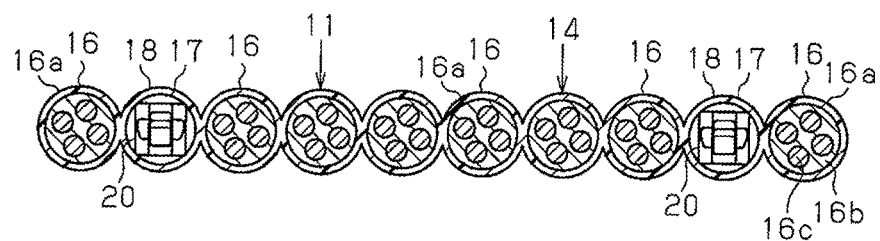
FIG. 12 is a diagrammatic cross-sectional view along the width, showing a flat cable assembly according to a third embodiment.

Next, a flat transmission device according to a third embodiment, which is a flat cable assembly 11, will now be described with reference to FIGS. 12 to 14. As shown in FIGS. 12 and 14, the flat cable assembly 11 includes two tubular portions 18, each of which is located between the cable 16 at an end in the width direction of a belt-like portion 14 and a cable 16 located at the center of the belt-like portion 14. In the present embodiment, as one example, each tubular portion 18 is located at the second position toward the center from one of the opposite ends in the width direction of the belt-like portion 14. A multi-joint supporting member 20 is inserted into each of the two tubular portions 18.

Figure 13:
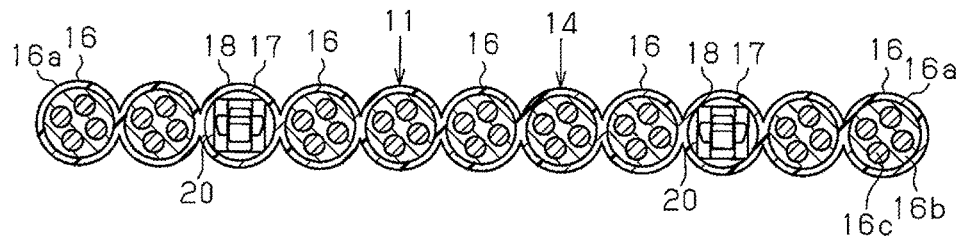
FIG. 13 is a diagrammatic cross-sectional view along the width, showing a flat cable assembly according to a modification different from that of FIG. 12.
Figure 14:
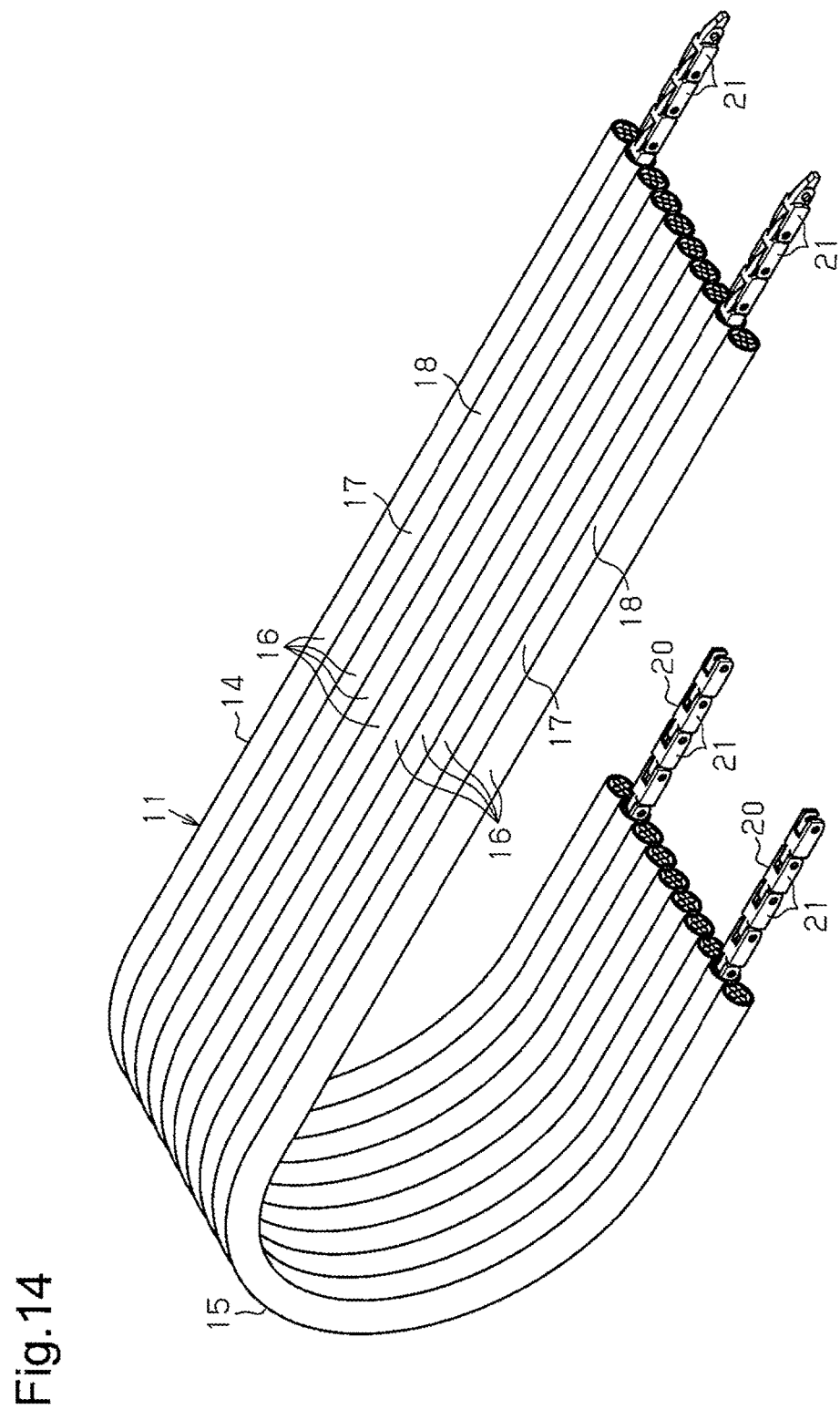
FIG. 14 is a perspective view, with a part cut away, illustrating the flat cable assembly of FIG. 12.

As shown in FIG. 13, the flat cable assembly 11 includes two tubular portions 18, each of which is located between the cable 16 at an end in the width direction of a belt-like portion 14 and a cable 16 located at the center of the belt-like portion 14. In the modification shown in FIG. 13, each tubular portion 18 is located at the third position toward the center from one of the opposite ends in the width direction of the belt-like portion 14. A multi-joint supporting member 20 is inserted into each of the two tubular portions 18.

In the modification of FIGS. 12 and 14, since the belt-like portion 14 has an even number of elongated members, one of the two elongated members at the center of the belt-like portion 14 is regarded as the transmitting member at the center. That is, each tubular portion 18 only needs to be located between one of the two elongated members at the opposite ends and the central two elongated members. In the modification of FIG. 13, since the belt-like portion 14 has an odd number of elongated members, the elongated member at the center of the belt-like portion 14 is regarded as the transmitting member at the center.

As described above, the third embodiment has the following advantage.

(10) Each of the two tubular portions 18 is located between one of the cables 16 at one of the opposite ends in the width direction of the belt-like portion 14 and the cable 16 located at the center in the belt-like portion 14, and a multi-joint supporting member 20 is inserted into each of the two tubular portions 18. Thus, the belt-like portion 14 is supported in a well-balanced manner as a whole. For example, in a case in which the supporting portions 17 are located at the opposite ends in the width direction of the belt-like portion as in the first embodiment, the center in the width direction of the flat cable assembly 11 tends to sag. In contrast, in the flat cable assembly 11 of the third embodiment, the belt-like portion 14 is supported by two supporting portions 17, which are located inward of the opposite ends of the belt-like portion 14. Thus, the center in the width direction of the belt-like portion 14 is effectively restrained from sagging.

The embodiments may be modified as follows.

Figure 15:
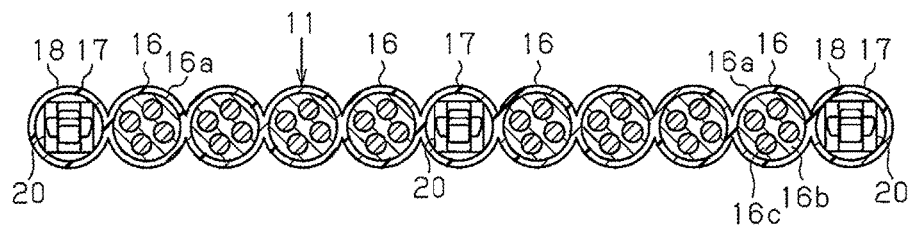
FIG. 15 is a diagrammatic cross-sectional view showing a flat cable assembly according to a modification.

In the first embodiment, a supporting portion 17 may be additionally provided at the center in the width direction of the belt-like portion 14. For example, in the modification of FIG. 15, two supporting portions 17 are arranged at the opposite ends in the width direction of the belt-like portion 14, and a single supporting portion 17 is arranged at the center in the width direction of the belt-like portion 14. If the belt-like portion 14 has an odd number of elongated members as in the modification of FIG. 15, a supporting portion 17 is preferably the elongated member at the center in the width direction of the belt-like portion 14. If the belt-like portion 14 has an even number of elongated members, a supporting portion 17 is preferably one of the two elongated members at the center in the width direction of the belt-like portion 14. With this configuration, the belt-like portion 14 is firmly supported from the opposite sides in the width direction. Also, compared to the first embodiment, the center portion in the width direction of the belt-like portion 14 is further effectively restrained from sagging. In the modification of FIG. 15, one of the two supporting portions 17 at the opposite ends in the width direction of the belt-like portion 14 may be shifted inward to the second or third positions from the ends.

Figure 16:
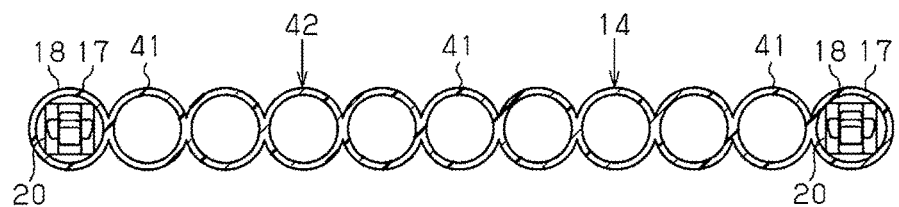
FIG. 16 is a diagrammatic cross-sectional view showing a flat hose assembly according to a modification.

The transmitting members constituting the belt-like portion 14 are not limited to the cables 16. For example, as shown in FIG. 16, the present invention may be applied to a flat hose assembly 42 (or flat tube assembly), which includes, as transmitting members, flexible tube portions 41, which are either hoses or tubes capable of transmitting at least one of air pressure or hydraulic pressure. As shown in FIG. 16, a supporting portion 17 is arranged at each of the opposite ends in the width direction of the belt-like portion 14. The supporting portions 17 in the flat hose assembly 42 may be arranged at the same positions as those in the second embodiment or the third embodiment. With this configuration, the flat hose assembly 42 achieves the same advantages as those of the first to third embodiments.

Figure 17:
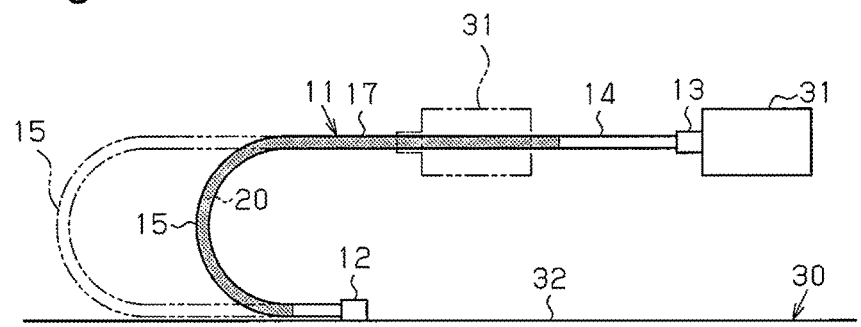
FIG. 17 is a diagrammatic side view showing a flat cable assembly according to a modification.

As shown in FIG. 17, the supporting portions 17, which are provided in the belt-like portion 14 of the flat cable assembly 11, may have a structure in which the multi-joint supporting members 20 are located only in a part of the entire length of the belt-like portion 14 between the fixed end held by the first clamp member 12 and the movable end held by the second clamp member 13. In the modification of FIG. 17, the multi-joint supporting members 20 are arranged in the supporting portions 17 at the shaded position in the longitudinal direction of the belt-like portion 14. The tubular portions 18 may be provided only at sections where the multi-joint supporting members 20 are attached. Alternatively, as in the above illustrated embodiments, the tubular portions 18 may be provided in a range corresponding to the length of the cables 16 or the tube portions 41, which constitute the belt-like portion 14. In the modification of FIG. 17, the multi-joint supporting members 20 are arranged in a part in the flat cable assembly 11 in which the flexed portion 15 is formed when the movable body 31 is moved in the whole movement range. Therefore, the bend radius of the flexed portion 15 formed in the flat cable assembly 11 is maintained to be larger than or equal to the previously defined bend radius R for an extended period of time. When the section that extends in the air between the flexed portion 15 of the flat cable assembly and the movable end is relatively long, the multi-joint supporting members 20 are located in a part of the section. Thus, the section that extends in the air between the flexed portion 15 of the flat cable assembly and the movable end is restrained from sagging due to its own weight.

Figure 18A:
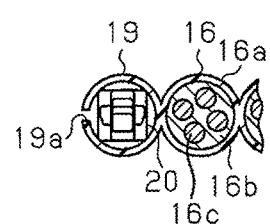
FIG. 18A is a partial cross-sectional view of a flat cable assembly according to a modification.
Figure 18B:
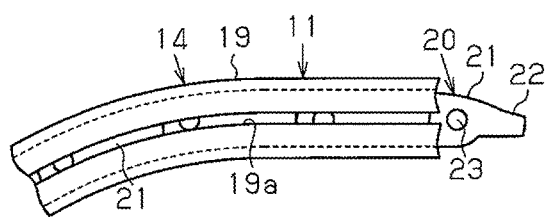
FIG. 18B is a partial side view of FIG. 18A.

The tubular portions are not limited to the closed structures over the entire length, but may be any member having a substantially tubular structure. As shown in FIGS. 18A and 18B, a tubular portion 19 may be employed that has a C-shaped cross section with a slit 19a extending along the longitudinal axis. The multi-joint supporting member 20 can be inserted into the tubular portion 19 from either open end in the longitudinal direction. Alternatively, the multi-joint supporting member 20 can be fitted in the tubular portion 19 by pushing open the slit 19a and pushing the multi-joint supporting member 20 into the tubular portion 19 through the pushed open slit 19a. This configuration facilitates insertion of the multi-joint supporting member 20 into the tubular portion 19. Also, the multi-joint supporting member 20 can be easily maintained through the slit 19a. In an environment where the acceptable level of wear debris is not significantly low, the flat cable assembly 11 shown in FIG. 18 can be used without any problems. The slit 19a may be replaced by a simple cut.

In the third embodiment, a supporting portion 17 may be additionally provided at the center in the width direction of the belt-like portion 14. If the belt-like portion 14 has an even number of elongated members, a supporting portion 17 is one of the two elongated members at the center in the width direction of the belt-like portion 14. If the belt-like portion 14 has an odd number of elongated members, a supporting portion 17 is the elongated member at the center in the width direction of the belt-like portion 14.

In the third embodiment, the positions of the supporting portions 17 may be arbitrarily selected as long as one supporting portion 17 is arranged between each of the opposite ends and the center. In the modifications of FIGS. 12 and 13, the supporting portions 17 are arranged at symmetrical positions with respect to the center line in the width direction of the belt-like portion 14. However, the supporting portions 17 may be arranged at asymmetric positions in the width direction. For example, one of the two the supporting portions 17 may be located at the second position toward the center from a first end in the width direction, and the other supporting portion 17 may be located at the third position toward the center from a second end in the width direction.

The method for coupling the tubular members to the transmitting members is not limited to the integral forming. The tubular members and the transmitting members may be fixed to each other with an adhesive. Alternatively, the tubular members may be welded to the transmitting members one by one. For example, a tubular portion 18 may be welded to each of the opposite sides in the width direction of a conventional flat cable assembly in which cables 16 are arranged in parallel and integrally formed. The method for welding may be thermal welding or vibration welding. Further, the tubular members and the transmitting members may be detachably coupled to each other in the following manner. That is, either the tubular members or the transmitting members may have engagement grooves of L-shaped cross sections or T-shaped cross sections, and the other may have engagement projections of L-shapes or T-shapes engageable with the engagement grooves. In this case, the engagement projections are inserted into the engagement grooves from a first end toward a second end in the longitudinal direction of the tubular members. A plurality of transmitting members is arranged at an inner part in the width direction of the belt-like portion 14. Via the coupling portions including an engagement groove and an engagement projection, a tubular portion 18 is coupled to each of the two transmitting members on the opposite ends in the width direction of the belt-like portion 14.

In the above illustrated embodiments, the outside diameters of the tubular members (the tubular portions 18) and the transmitting members (the cables 16, the tubes, the hoses) are substantially the same. However, the outside diameters may vary. For example, in a case in which the belt-like portion is constituted by transmitting members of different outside diameters, the outside diameter of the tubular members may be smaller than or equal to the greatest outside diameter of the transmitting members. In the above illustrated embodiments, the outside diameter of the tubular members may be smaller than the outside diameter of the transmitting members. With these configurations, since the outside diameter of the tubular members is smaller than or equal to the outside diameter of the transmitting members, which constitute the belt-like portion, the tubular members do not increase the thickness of the belt-like portion of the flat transmission device. This restrains sliding between the flat cable assembly and the facility and generation of wear debris, which are problems caused by an increase in the thickness by addition of supporting members in the prior art. Also, the outside diameter of the tubular members may be larger than the largest diameter of the transmitting members. With this configuration, unlike the prior art, in which the supporting members are provided at the opposite sides in the thickness direction of the belt-like portion, the tubular members are arranged in parallel with the transmitting members to constitute the belt-like portion. Thus, an increase in the thickness of the belt-like portion is only equivalent to the difference between the outside diameter of the transmitting members and the outside diameter of the tubular members. The thickness of the belt-like portion is therefore not excessively increased. This restrains the belt-like portion and the facility from sliding onto each other. Even if the belt-like portion and the facility slide onto each other, the tubular members, which have a larger diameter than the transmitting members, first slide onto the facility. Sliding of the transmitting members onto the facility thus can be easily avoided so that the life of the transmitting members is restrained from being shortened due to wear caused by sliding. For example, wear of the coating members 16a caused by sliding with the facility is limited so that the life of the cables 16 is extended. In this case, the material of the tubular members is preferably a low-wear material that is harder to wear than the material of the coating members 16a. In the flat transmission device, the outside diameters of the tubular members may be different from one another.

In the first to third embodiments and the modifications shown in FIGS. 15 and 16, instead of the configuration in which the tubular portions 18 are made of the same material as that of the coating members 16a, the tubular portions 18 may be made of a plastic that is different from the material of the coating members 16a. The tubular portions 18 may be made of the same material as that of tubes or hoses, which are transmitting members. The tubular portions 18 may be made of a plastic or a synthetic rubber that is different from the material of tubes or hoses.

The flat transmission device is not limited to the flat cable assembly 11, in which all the transmitting members are cables. However, in addition to the cables 16, the flat transmission device may include, as transmitting members, hoses or tubes capable of transmitting at least one of air pressure and hydraulic pressure. For example, the flat transmission device may be constituted by cables 16 and tubes for air pressure, by cables 16 and hoses for hydraulic pressure, by tubes for air pressure and hoses for hydraulic pressure, or by cables 16, tubes for air pressure, and hoses for hydraulic pressure.

In place of the configuration in which a single elongated multi-joint supporting member 20 is inserted into each tubular portion 18, two or more short multi-joint supporting members 20 may be arranged in series and inserted into each tubular portion 18.

A configuration may be employed that includes one or more tubular portions 18 into each of which a multi-joint supporting member 20 is inserted and one or more tubular portions 18 into which no multi-joint supporting members 20 are inserted. A multi-joint supporting member 20 is inserted into at least one of the tubular portions 18 that is selected in accordance with customer needs, so that a flat cable assembly 11 that conforms to the customer needs is provided. In this modification, the tubular portions 18 refer to tubular members other than transmitting members such as tubes for air pressure and hoses for hydraulic pressure.

In the above illustrated embodiments, the multi-joint supporting members are restricted from flexing in the second direction from the straight position. The straight position may include a position at which the multi-joint supporting members are slightly flexible in the second direction or the first direction to have a concave shape. In these configurations, sagging of the section that extends in the air between the flexed portion 15 and the movable end is reduced compared to that in a case in which no multi-joint supporting member is inserted. Thus, the section between the flexed portion 15 and the movable end is restrained from sagging excessively.

A flat transmission device may be produced by removing the conducting wire 16b from one or two of the cables 16 constituting a flat cable assembly and inserting a multi-joint supporting member 20 in each of the tubular coating members 16a (sheaths) from which the conducting wires 16b have been removed. With this method also, the same advantages as the above illustrated embodiments are obtained.

DESCRIPTION OF THE REFERENCE NUMERALS

11 . . . Flat cable assembly as Flat Transmission Device, 12 . . . First Clamp Member (Fixed End), 13 . . . Second Clamp Member (Movable End), 14 . . . Belt-Like Portion, 15 . . . Flexed portion, 16 . . . Cable as Transmitting Member, 16a . . . Coating Member, 17 . . . Supporting portion, 18 . . . Tubular Portion as Tubular Member, 19 . . . Tubular Portion as Tubular Member, 19a . . . Slit, Joint Supporting member, 21 . . . Link Member, 21a . . . Recess, 22 . . . Extension, 23 . . . Shaft Portion, 30 . . . Facility, 31 . . . Movable Body, 32 . . . Attachment Surface, 41 . . . Tube Portion as Transmitting Member, 42 . . . Flat Hose Assembly as Flat Transmission Device, R . . . Previously defined bend radius

The invention claimed is:

1. A flat transmission device comprising:
a belt-like portion, wherein
a plurality of flexible transmitting members and one or more flexible tubular members are arranged in parallel, wherein each transmitting member includes a conducting wire, which is capable of transmitting electricity, and a coating member, which coats the conducting wire such that the conducting wire is immovable relative to the coating member,
each tubular member is made of the same material as the coating members, and
the coating members of the transmitting members in each adjacent pair are coupled to each other, the coating member of the transmitting member and the tubular member in each adjacent pair are coupled to each other, and the tubular members in each adjacent pair are coupled to each other, so that the transmitting members and the tubular members form a belt-like structure; and
an elongated multi joint supporting member, which includes link members, wherein the link members are arranged in series, and the link members in each adjacent pair are pivotally coupled to each other, wherein
the multi joint supporting member is restricted from being pivoted beyond a previously defined bend radius in a first direction along an axis that is perpendicular to a longitudinal axis and is restricted from flexing in a second direction that is opposite to the first direction, and
the multi-joint supporting member is inserted into at least one of the tubular members.

2. The flat transmission device according to claim 1, wherein
the tubular members include two tubular members that are provided on opposite sides in a width direction of the belt-like portion, and
the multi joint supporting member is inserted into each of the tubular members.

3. The flat transmission device according to claim 2, wherein the opposite sides in the width direction of the belt-like portion are opposite ends in the width direction of the belt-like portion.

4. The flat transmission device according to claim 1, wherein
the tubular members include one tubular member that is provided at a center in the width direction of the belt-like portion, and
the multi-joint supporting member is inserted into the tubular member at the center.

5. The flat transmission device according to claim 1, wherein
the transmitting members include two transmitting members each located at one of opposite ends in a width direction of the belt-like portion and one transmitting member located at a center in the width direction of the belt-like portion,
the tubular members include at least two tubular members that are each arranged between one of the two transmitting members at the opposite ends and the transmitting member located at the center, and
the multi joint supporting member is inserted into each of the tubular members.

6. A method for using a flat transmission device, wherein in a belt-like portion,
a plurality of flexible transmitting members and one or more tubular members are arranged in parallel, wherein each transmitting member includes a conducting wire, which is capable of transmitting electricity, and a coating member, which coats the conducting wire such that the conducting wire is immovable relative to the coating member,
each tubular member is made of the same material as the coating members, and
the coating members of the transmitting members in each adjacent pair are coupled to each other, the coating member of the transmitting member and the tubular member in each adjacent pair are coupled to each other, and the tubular members in each adjacent pair are coupled to each other, so that the transmitting members and the tubular members form a belt-like structure,
an elongated multi joint supporting member includes link members, wherein the link members are arranged in series, and the link members in each adjacent pair are pivotally coupled to each other, and
the multi joint supporting member is restricted from being pivoted beyond a previously defined bend radius in a first direction along an axis that is perpendicular to a longitudinal axis and is restricted from flexing in a second direction that is opposite to the first direction,
the method comprising:
inserting the multi joint supporting member into at least one of the tubular members;
in a state in which a fixed end, which is a first end in a longitudinal direction of the belt like portion of the flat transmission device, is fixed, when moving a movable end, which is a second end of the belt-like portion, while forming a flexed portion in a middle of the belt-like portion, restricting flexing of the flexed portion, which moves together with the movable end, within a range to a bend radius, which is previously defined by the multi joint supporting member; and
restricting flexing of the multi joint supporting member in the second direction, thereby restraining a section between the flexed portion and the movable end from warping due to an own weight.

7. The flat transmission device according to claim 1, wherein each tubular member has an outside diameter that is smaller than an outside diameter of the transmitting members.

8. A method for manufacturing a flat transmission device, wherein the flat transmission device comprising:
a belt-like portion, wherein
a plurality of flexible transmitting members and one or more flexible tubular members are arranged in parallel, each transmitting member being capable of transmitting electricity and
the transmitting members in each adjacent pair are coupled to each other, the transmitting member and the tubular member in each adjacent pair are coupled to each other, and the tubular members in each adjacent pair are coupled to each other, so that the transmitting members and the tubular members form a belt-like structure; and
an elongated multi joint supporting member, which includes link members, wherein the link members are arranged in series, and the link members in each adjacent pair are pivotally coupled to each other, wherein
the multi joint supporting member is restricted from being pivoted beyond a previously defined bend radius in a first direction along an axis that is perpendicular to a longitudinal axis and is restricted from flexing in a second direction that is opposite to the first direction, and the multi-joint supporting member is inserted into at least one of the tubular members, the method comprising:

setting at least one core member and a plurality of conducting wires at a feed port of an extruder, wherein each of the conducting wires is capable of transmitting electricity, extruding, by the extruder, a belt-like portion, which includes at least one tubular member and a plurality of transmitting members, wherein the tubular member includes the core member inside the tubular member, and each of the transmitting members includes one of the conducting wires, removing the core member from the inside of the tubular member, and inserting a multi joint supporting member into the tubular member.

* * * * *